United States Patent Office 3,644,363
Patented Feb. 22, 1972

3,644,363
1,4-DIOXIDOQUINOXALINYL NITRONES
Hyun Koo Kim, Ashland, Ohio, assignor to Richardson-Merrell Inc., New York, N.Y.
No Drawing. Filed Sept. 2, 1969, Ser. No. 854,796
Int. Cl. C07d 51/78
U.S. Cl. 260—250                                4 Claims

ABSTRACT OF THE DISCLOSURE 1,4-dioxidoquinoxalinyl nitrones having the formula

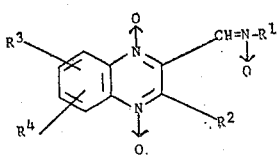

in which $R^1$ is an alkyl radical of 1 to 10 carbon atoms of straight, branched chain or cyclic configuration which may be substituted with hydroxy, dihydroxy, alkoxy, acyloxy, halogen, or trihalo groups; or $R^1$ may be a phenyl radical or a phenyl radical substituted with a lower alkyl group of 1 to 4 carbon atoms or a halogen; $R^2$ is hydrogen, lower alkyl of 1 to 4 carbon atoms, and $R^3$ and $R^4$ are chosen from the group consisting of hydrogen, alkoxy or alkyl of 1 to 4 carbon atoms, halogen, trihalomethyl, or nitro groups. These new compounds, which are potent antibacterial agents, are effective orally, topically and parenterally in low concentrations in inhibiting the growth of both gram-negative and gram-positive bacteria. The compounds may be made by reacting an appropriate 2-formylquinoxaline 1,4-dioxide with an N-substituted hydroxylamine.

---

This invention relates to new organic compounds and to a process of preparing the same. The new compounds of the invention are 1,4-dioxidoquinoxalinyl nitrones having the following general formula:

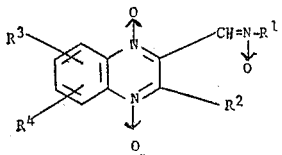

in which $R^1$ is an alkyl radical of 1 to 10 carbon atoms of straight, branched chain or cyclic configuration which may be substituted with hydroxy, dihydroxy, alkoxy, acyloxy, halogen, or trihalo groups, or $R^1$ may be a phenyl radical or a phenyl radical substituted with a lower alkyl group of 1 to 4 carbon atoms or a halogen; $R^2$ is hydrogen, lower alkyl of 1 to 4 carbon atoms; and $R^3$ and $R^4$ are chosen from the group consisting of hydrogen, alkoxy or alkyl of 1 to 4 carbon atoms, halogen, trihalomethyl, or nitro groups.

The new compounds of the present invention are potent antibacterial agents and they have been found to inhibit the growth of both gram-negative and gram-positive bacteria at very low concentrations. They are effective when administered orally, parenterally or topically in the form of tablets, capsules, solutions, ointments, and other usual dosage unit forms prepared with suitable binders, extenders, emulsifiers, solvents, and other acceptable non-toxic carriers. The compounds may be effectively used as therapeutic agents when administered in animal feeds or their drinking water. They are capable of preventing the death of mice which are infected lethally with *Salmonella choleraesuis* or *Escherichia coli*, as will be noted in more detail hereinafter.

The new compounds of the present invention may be prepared by treating a 2-formylquinoxaline-1,4-dioxide of the formula

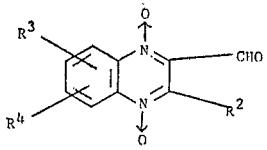

with an N-substituted hydroxylamine of the formula $$R^1NHOH$$

in which $R^1$, $R^2$, $R^3$ and $R^4$ are as defined above.

The reaction is carried out in the inert organic solvent such as an alcohol, benzene, chloroform, methylene chloride, dioxane, dimethylformamide, tetrahydrofuran, and the like. The materials are combined in equimolar amounts in the inert solvent and allowed to react until the nitrone formation is complete. It is often advantageous to heat the reaction mixture to facilitate the completion of the reaction. The use of a Dean-Stark water separation apparatus is often useful in the promotion of the completion of the reaction by removal of water which is formed. In certain instances it may be helpful to use an acid addition salt of the hydroxylamine, in which case a mild base such as sodium acetate, sodium bicarbonate, potassium bicarbonate, sodium carbonate, potassium carbonate, etc. is added to the reaction mixture to control the pH between 6 to 10.

After completion of the reaction the nitrone is recovered from the mixture by conventional procedures such as filtration, trituration with an inert organic solvent, evaporation of the solvent, and the like. They can be further purified by recrystallization.

The hydroxylamines ($R^1$—NHOH) used to prepare the 1,4-dioxidoquinoxalinyl nitrones described herein can be prepared by known methods, such as chemical and catalytic reduction of the corresponding nitro compound, diborane reduction of oxime, and displacement of halogen with hydroxylamine ($NH_2OH$), for instance.

EXAMPLE 1

α-(3-methyl-1,4-dioxidoquinoxalin-2-yl)-N-methylnitrone

A mixture of 2-formyl-3-methylquinoxaline 1,4-dioxide (2.04 g., 0.01 mole) and N-methylhydroxylamine hydrochloride (0.84 g., 0.01 mole) in warm 95% ethanol (30 ml.) containing sodium bicarbonate (0.84 g., 0.012 mole) was stirred and yellow solid began to precipitate after 1 hour. The mixture was filtered and the filter cake was thoroughly washed with nitromethane until no yellow color remained. Evaporation of the filtrate gave 1.52 grams of a bright yellow solid, M.P. 159–162° dec. An analytical sample, M.P. 171;173° dec. was obtained by recrystallizing this material from nitromethane.

*Analysis.*—Calcd. for $C_{11}H_{11}N_3O_3$ (percent): C, 56.65; H, 4.76; N, 18.02. Found (percent): C. 56.31; H, 4.76; N, 17.87.

The compound of this example was effective in inhibiting the growth of *Salmonella gallinarum* and *Salmonella typhimurium* at concentrations of 10 micrograms per milliliter and the growth of *Proteus mirabilis* and *Escherichia coli* at 100 micrograms per milliliter in vitro in a tripticase soy broth culture fluid.

The compound of this example was 100% effective at a level of 0.025% of the drugs in preventing death of mice infected with a leathal dose of *Salmonella choleraesuis* in the test procedure described at the end of the examples.

Previously weaned, unvaccinated pigs, ranging in weight from 8.25 to 13.50 kg. and 7 to 8 weeks of age, were heavily infected with the organism *Salmonella choleraesuis*, variety Kunzendorf. Two of these pigs were given orally an aqueous suspension of 300 mg. of the above compound per day commencing on the morning of the day of experimental infection and the medication was repeated 24 and 48 hours later. In a control group of infected, unmedicated pigs, each of the two pigs lost weight during the experiment. The body temperature of the infected, unmedicated control pigs rose to above normal in the days following infection and diarrhea appeared after five days. On the other hand, the pigs treated with the compound of the above example maintained a normal temperature throughout the experiment and gained weight. No diarrhea was observed throughout the observation period of 7 days. No evidence of toxicity as a result of the medication was noted.

Other experiments indicate that the acompound of this example would be effective at levels of 25 to 30 mg./kg. of body weight per day in preventing infection of swine with *Salmonella choleraesuis* when administered in their drinking water.

The compound of this example was also 100% effective in preventing death of mice infected with a lethal dose of *Escherichia coli* in the test procedure described following the specific examples.

EXAMPLE 2

α-(3-methyl-1,4-dioxidoquinoxalin-2-yl)-N-ethylnitrone

This compound was prepared by reacting 2-formyl-3-methylquinoxaline 1,4-dioxide (2.04 g., 0.01 mole) with N-ethylhydroxylamine oxalate (1.06 g., 0.005 mole) in the presence of sodium bicarbonate (1.01 g., 0.012 mole) as described in Example 8. Recrystallization of the product from absolute ethanol gave a yellow solid (1.20 g,. 44%), M.P. 177–178° dec.

The compounds of this example inhibited the growth of *Salmonella gallinarum* and *Pasteurella multocida* at concentrations of 10 mcg./ml. of culture fluid and it inhibited the growth of *Staphylococcus aureus, Streptococcus agalactiae, Proteus mirabilis,* and *Escherichia coli* at concentrations of 100 mcg./ml.

This compound saved 60% of the mice infected with *Salmonella choleraesuis* and 100% of the mice infected with *Escherichia coli* in the tests described at the end of the examples.

EXAMPLE 3

α-(3-methyl-1,4-dioxidoquinoxalin-2-yl)-N-decylnitrone

This compound was prepared by reacting 2-formyl-3-methylquinoxaline 1,4-dioxide (11 g., 0.054 mole) with N-decylhydroxylamine hydrochloride (12.6 g., 0.06 mole) in the presence of sodium bicarbonate (10 g., 0.12 mole) as described in Example 1. Recrystallization of the product from absolute ethanol gave a yellow solid (13.6 g., 70%), M.P. 105–108°.

This compound inhibited the growth of *Staphylococcus aureus* at concentrations of 100 mcg./ml.

EXAMPLE 4

α-(3-methyl-1,4-dioxidoquinoxalin-2-yl)-N-(2-chloroethyl)nitrone

Following the procedure described in Example 1, 2-formyl-3-methylquinoxaline, 1,4-dioxide (0.5 g., 0.0025 mole), N-(2-chloroethyl)-hydroxylamine hydrochloride (0.8 g., 0.006 mole) and sodium bicarbonate (0.56 g., 0.0067 mole) were reacted to give a bright yellow solid (0.5 g., 70%). An analytical sample, M.P. 157° dec., was prepared by crystallizing the solid from absolute ethanol.

This compound was active against *Salmonella gallinarum* at 10 mcg./ml. and active against *Salmonella typhimurium, Bacillus subtilis, Escherichia coli,* and *Pasteurella multocida* at concentrations of 100 mcg./ml.

This compound saved 80% of mice infected with lethal doses of *Salmonella choleraesuis* and 100% of mice infected with *Escherichia coli* when tested as described at the end of the examples.

EXAMPLE 5

α-(3-methyl-1,4-dioxidoquinoxalin-2-yl)-N-(2-chloropropyl)nitrone

This compound was prepared by reacting 2-formyl-3-methylquinoxaline 1,4-dioxide (1 g., 0.005 mole), N-(2-chloropropyl)hydroxylamine oxalate (0.8 g., 0.0025 mole) and sodium bicarbonate (0.50 g., 0.060 mole) in absolute ethanol (20 ml.) as described in Example 8. The product was crystallized from absolute ethanol and a yellow solid (0.8 g., 54%), M.P. 173.5° dec. was obtained.

This compound inhibited the growth of *Proteus mirabilis* at concentrations as low as 1 mcg./ml. of culture medium and inhibited the growth of *Salmonella gallinarum, Salmonella typhimurium, Bacillus subtilis* and *Escherichia coli* at concentrations of 100 mcg./ml.

The compound was effective in saving 80% of mice infected with *Escherichia coli*.

EXAMPLE 6

α-(3-methyl-1,4-dioxidoquinoxalin-2-yl)-N-(1,3-dichloro-2-propyl)nitrone

This compound was prepared as described in Example 1 by reacting 2-formyl-3-methylquinoxaline 1,4-dioxide (10 g., 0.05 mole), N-(1,3-dichloro-2-propyl)hydroxylamine hydrochloride (11 g., 0.06 mole) and sodium bicarbonate (6.2 g., 0.074 mole). Recrystallization of the product from absolute ethanol-nitromethane solution (1:1) gave a yellow solid (8 g., 48.5%), M.P. 160° dec.

This compound was effective at concentrations of 100 mcg./ml. of culture medium against *Salmonella gallinarum* and *Pasteurella multocida*.

The compound was moderately effective in reducing mortality in mice infected with lethal doses of *Salmonella choleraesuis* and *Escherichia coli*.

EXAMPLE 7

α-(3-methyl-1,4-dioxidoquinoxalin-2-yl)-N-(1,1,1-trifluoro-2-propyl)nitrone

This compound was prepared by reacting 2-formyl-3-methylquinoxaline, 1,4-dioxide (13.3 g., 0.065 mole), N-(1,1,1 - trifluoro-2-propyl)hydroxylamine hydrochloride (12 g., 0.073 mole) and sodium bicarbonate (8 g., 0.095 mole) as described in Example 1. The product was crystallized from absolute ethanol to give a yellow solid (6 g., 30% yield), M.P. 207–207.5°.

This compound was effective in vitro against *Staphylococcus aureus* and *Streptococcus agalactiae* at concentrations of 10 mcg./ml. culture medium.

EXAMPLE 8

α-(3-methyl-1,4-dioxidoquinoxalin-2-yl)-N-(2-hydroxyethyl)nitrone

To a stirred solution of 2-formyl-3-methylquinoxaline 1,4-dioxide (2.04 g., 0.01 mole) in warm 95% ethanol (30 ml.) containing sodium bicarbonate (1.01 g., 0.012 mole) there was added finely ground 2-hydroxylaminoethanol oxalate (1.22 g., 0.005 mole) and stirring was continued for one hour. A yellow solid began to precipitate after one hour. After work-up and recrystallization in a manner similar to that described in Example 1, a bright yellow solid (1.75 g., 66%), M.P. 164–165° dec. was obtained.

This compound was effective against *Salmonella gallinarum* and *Salmonella typhimurium* at 10 mcg./ml. of culture medium and was effective in inhibiting the growth of *Proteus mirabilis* and *Escherichia coli at* 100 cmg./ml.

The compounds saved one half of the experimental mice infected with *Salmonella choleraesuis* under the conditions described below and saved 100% of the mice infected with *Escherichia coli*.

EXAMPLE 9

α-(3-methyl-1,4-dioxidoquinoxalin-2-yl)-N-(2-hydroxy-1-methylethyl)nitrone

Following the procedure described in Example 8, 2-formyl-3-methylquinoxaline 1,4-dioxide (2.04 g., 0.01 mole) and 2-hydroxyamino-1-propanol oxalate (1.36 g., 0.005 mole) gave bright yellow crystals (2.0 g., 72%), M.P. 187–188° dec. An analytical sample, M.P. 190–191° dec. was obtained by recrystallizing this material from nitromethane.

The compound of this example inhibited the growth of *Salmonella gallinarum* at concentrations of 10 mcg./ml. and it inhibited the growth of *Streptococcus agalactiae*, *Bacillus subtilis*, *Escherichia coli* and *Proteus mirabilis* at concentrations of 100 mcg./ml.

The above compound also protected 80% of the mice infected with *Salmonella choleraesuis* at drug levels of 0.025% by weight of the feed and 100% of mice infected with *Escherichia coli* at drug levels of 25 mg./kg. of body weight.

EXAMPLE 10

α-(3-methyl-1,4-dioxidoquinoxalin-2-yl)-N-(2-hydroxy-2-methylethyl)nitrone

This compound was obtained in a manner similar to that described in Example 8 from 2-formyl-3-methylquinoxaline, 1,4-dioxide (2.04 g., 0.01 mole) and 1-hydroxylamino-2-propanol oxalate (1.36 g., 0.005 mole). Recrystallization of the crude product from nitromethane gave a bright yellow solid (2.0 g., 72%), M.P. 176–178° dec. This compound inhibited the growth of *Salmonella gallinarum* at 10 mcg./ml. and also inhibited the growth of *Salmonella typhimurium* and *Escherichia coli* at 100 mcg./ml. It gave excellent protection to mice in in vivo tests with *Escherichia coli* and *Salmonella choleraesuis*.

EXAMPLE 11

α-(3-methyl-1,4-dioxidoquinoxalin-2-yl)-N-(1,3-dihydroxy-2-propyl)nitrone

Following the procedure described in Example 8, 2-formyl-3-methylquinoxaline, 1,4-dioxide (2.04 g., 0.01 mole) and 2 - hydroxylamino - 1,3 - propanediol oxalate (1.52 g., 0.005 mole) gave bright yellow crystals (1.0 g., 34%), M.P. 200–201° dec. An analytical sample, M.P. 202–203° dec. was obtained by recrystallizing this material from ethanol.

The compound of this example was effective in inhibiting the growth of *Salmonella gallinarum*, *Salmonella typhimurium* and *Escherichia coli* at concentrations of 100 mcg./ml. of culture medium. The compound had low in vivo activity against *Salmonella choleraesuis* infections in mice and fairly good activity in protecting mice against infections of *Escherichia coli*.

EXAMPLE 12

α-(3-methyl-1,4-dioxidoquinoxlin-2-yl)-N-(2-acetoxyethyl)nitrone

In a manner similar to that described in Example 8, 2-formyl-3-methylquinoxaline 1,4 - dioxide (2.04 g., 0.01 mole), 2-hydroxylaminoethylacetate oxalate (1.64 g., 0.005 mole) and sodium bicarbonate (1.01 g., 0.012 mole) were reacted in absolute ethanol. The product was crystallized from ethanol to give a yellow solid (1.29 g., 42%), M.P. 177–178° dec.

This compound was effective against *Salmonella gallinarum* at 10 mcg./ml. and effective in inhibiting the growth of *Salmonella typhimurium*, *Bacillus subtilis*, *Escherichia coli* and *Proteus mirabilis* at 100 mcg./ml. The compound was also active in protecting 60% of mice infected with *Salmonella choleraesuis* and 100% of the mice infected with *Escherichia coli* under the conditions of the experiments described below.

EXAMPLE 13

α-(3-methyl-1,4-dioxidoquinoxalin-2-yl)-N-(2-ethoxyethyl)nitrone

In a manner similar to that described in Example 8, 2-formyl-3-methylquinoxaline 1,4-dioxide (10 g., 0.05 mole), N-(2-ethoxyethyl)-hydroxylamine oxalate (9.6 g., 0.032 mole) and sodium bicarbonate (6.2 g., 0.073 mole) were reacted in absolute ethanol (100 ml.). The product was crystallized from absolute ethanol to give a yellow solid (9 g., 61%), M.P. 156–158°.

This compound was active in inhibiting the growth of *Salmonella gallinarum*, *Escherichia coli* and *Proteus mirabilis* at concentrations of 100 mcg./ml. The compound is also active in preventing death of 60% of the mice infected with lethal doses of *Salmonella choleraesuis* and it was 100% effective in mice with lethal injections of *Escherichia coli*.

EXAMPLE 14

α-(3-methyl-1,4-dioxidoquinoxalin-2-yl)-N-cyclohexylnitrone

A solution of 2-formyl-3-methylquinoxaline 1,4-dioxide (9.5 g., 0.047 mole) and N-cyclohexylhydroxylamine (5.4 g., 0.047 mole) in absolute ethanol (130 ml.) was stirred at room temperature for 16 hours to give a yellow solid (9.4 g., 66%), M.P. 206–207°. An analytical sample (M.P. 206–208°) was prepared by recrystallizing the product from 95% ethanol.

This compound was active against *Salmonella gallinarum* and *Proteus mirabilis* at concentrations of 100 mcg./ml. It had only slight in vivo activity in mice infected with *Salmonella choleraesuis* under the conditions of experiment as outlined below.

EXAMPLE 15

α-(3-methyl-1,4-dioxidoquinoxaline-2-yl)-N-phenylnitrone

A mixture of 2-formyl-3-methylquinoxaline 1,4-dioxide (2.04 g., 0.01 mole) and N-phenylhydroxylamine (1.09 g., 0.01 mole) in chloroform (40 ml.) was refluxed using a Dean-Stark water separator. After refluxing 0.5 hour, the reaction mixture was cooled and the solvent was removed in vacuo. Ether (40 ml.) was added to the black-brown residue and the mixture chilled at ca. 0°. Filtration gave 2.4 g. (67%) yellow solid, M.P. 122° dec. An analytical sample, M.P. 164–165° dec. was obtained by recrystallizing this material from benzene.

This compound was active in inhibiting the growth of *Salmonella gallinarum and Candida albicans* at concentrations of 100 mcg./ml. It protected 40% of the mice infected with lethal doses of *Salmonella choleraesuis* and *Escherichia coli*.

EXAMPLE 16

α-(3-methyl-1,4-dioxidoquinoxalin-2-yl)-N-p-chlorophenylnitrone

Following the procedure described in Example 15, 2-formyl-3-methylquinoxaline 1,4-dioxide (2.04 g., 0.01 mole) and N-p-chlorophenylhydroxylamine (1.43 g., 0.01 mole) gave a yellow solid (1.40 g., 85%), M.P. 194° dec. An analytical sample, M.P. 203° dec., was obtained by recrystallizing this material from nitromethane.

EXAMPLE 17

α-(3-methyl-1,4-dioxidoquinoxalin-2-yl)-N-p-tolylnitrone

This compound was prepared by reacting 2-formyl-3-methylquinoxaline 1,4-dioxide (2.04 g., 0.01 mole) with N-p-tolylhydroxylamine (1.23 g., 0.01 mole) as described in Example 15. Recrystallization of the product from nitromethane gave a yellow solid (0.93 g., 30%), M.P. 116–117° dec.

EXAMPLE 18

α-(1,4-dioxidoquinoxalin-2-yl)-N-methylnitrone

Following the procedure described in Example 1, 2-formylquinoxaline-1,4-dioxide (1.90 g., 0.01 mole) and N-methylhydroxylamine hydrochloride (0.84 g., 0.01 mole) gave the title compound. Recrystallization of the product from nitromethane gave a bright yellow solid (1.30 g., 59%), M.P. 212–220° dec.

This compound inhibited the growth of *Salmonella gallinarum* and *Salmonella typhimurium* at concentrations of 10 mcg./ml. and it inhibited the growth of *Staphyloccus aureus, Streptococcus agalactiae, Proteus mirabilis, Bacillus subtilis, Escherichia coli* and *Candida albicans* at concentrations of 100 mcg./ml. The compound was weakly active (20%) in vivo against *Salmonella choleraesuis*, but had good activity (80%) against *Escherichia coli* in mice.

EXAMPLE 19

α-(1,4-dioxidoquinoxalin-2-yl)-N-(2-hydroxyethyl) nitrone

Following the procedure described in Example 8, 2-formylquinoxaline 1,4-dioxide (1.90 g., 0.01 mole) and 2-hydroxylaminoethanol oxalate (1.22 g., 0.005 mole) gave golden yellow needles (28%, 0.7 g.), M.P. 197–198° dec. (from $CH_3NO_2:CH_3OH$).

This compound was active against *Salmonella gallinarum, Salmonella typhimurium, Streptococcus agalactiae, Staphylococcus aureus,* and *Escherichia coli* at concentrations of 100 mcg./ml. It was weakly active against *Salmonella choleraesuis* in mice and moderately active against *Escherichia coli* in mice.

EXAMPLE 20

α-[6 (or 7)-methoxy-3-methyl-1,4-dioxidoquinoxalin-2-yl]-N-methylnitrone

Following the procedure described in Example 1, 2-formyl-3,6 (or 3,7) - dimethylquinoxaline 1,4-dioxide (2.18 g., 0.01 mole) and N-methylhydroxylamine hydrochloride (0.84 g., 0.01 mole) gave a bright yellow solid (0.79 g., 32%), M.P. 180° dec. (from $CH_3NO_2$).

This compound had in vitro activity against *Salmonella gallinarum, Salmonella typhimurium, Proteus mirabilis, Escherichia coli* and *Candida albicans* at 100 mcg./ml. The compound was 100% effective in protecting mice against lethal infections of *Salmonella choleraesuis* and *Escherichia coli*.

EXAMPLE 21

α-[6 (or 7)-methoxy-3-methyl-1,4-dioxidoquinoxalin-2-yl]-N-methylnitrone

Similarly, 2-formyl-6 (or 7)-methoxy-3-methylquinoxaline 1,4-dioxide (2.34 g., 0.01 mole) and N-methyldroxylamine hydrochloride (0.84 g., 0.01 mole) gave a bright yellow solid (1.4 g., 58%), M.P. 180–182° dec. (from $CH_3NO_2$).

This compound was effective in vitro against *Salmonella gallinarum* at 10 mcg./ml. and effective against *Salmonella typhimurium, Proteus mirabilis, Bacillus subtilis, Escherichia coli* and *Pasteurella multocida* at 100 mcg./ml. It had good activity in protecting mice against *Salmonella choleraesuis* and was 100° effective in protecting mice against *Escherichia coli*.

EXAMPLE 22

α-[3-methyl-6 (or 7)-trifluoromethyl-1,4-dioxido-quinoxalin-2-yl]-N-methylnitrone Following the procedure described in Example 1, 2-formyl-3-methyl-6 (or 7)-trifluoromethylquinoxaline 1,4-dioxide (2.72 g., 0.01 mole) and N-methylhydroxylamine hydrochloride (0.84 g., 0.01 mole) gave a yellow solid (1.05 g., 35%), M.P. 181–182° dec. (from EtOH).

This compound inhibited the growth of *Escherichia coli* and *Pasteurella multocida* at 10 mcg./ml. and *Salmonella gallinarum, Streptococcus agalactiae* and *Bacillus subtilis* at 100 mcg./ml. The compound also had activity in vivo in protecting mice against infections of *Salmonella choleraesuis* and *Escherichia coli*.

EXAMPLE 23

α-[6 (or 7)-chloro-3-methyl-1,4-dioxidoquinoxalin-2-yl]-N-methylnitrone

Following the procedure described in Example 1, 2-formyl-6 (or 7)-chloro-3-methylquinoxalin 1,4-dioxide (2.39 g., 0.01 mole) and N-methylhydroxylamine hydrochloride (0.84 g., 0.01 mole) gave a yellow solid (1.15 g., 43%), M.P. 189–190° dec. (from $CH_3NO_2$).

This compound is highly active against *Salmonella gallinarum, Salmonella typhimurium* and *Pasteurella multocida* in vitro at 1 mcg./ml. It was also active against *Proteus mirabilis, Erisipelothrix insidiosa, Bacillus subtilis, Escherichia coli, Aspergillus fumigatus* and *Candida albicans* at 100 mcg./ml. The compound also had good activity in mice against *Salmonella choleraesuis* and was 100% effective in preventing deaths of mice infected with fatal doses of *Escherichia coli*.

EXAMPLE 24

α-[6 (or 7)-nitro-3-methyl-1,4-dioxidoquinoxalin-2-yl]-N-methylnitrone

Following the procedure described in Example 1, 2-formyl-6 (or 7)-nitro-3 - methylquinoxaline 1,4-dioxide (2.49 g., 0.01 mole) and N-methylhydroxylamine hydrochloride (0.84 g., 0.01 mole) gave an orange solid (0.39 g., 14%), M.P. 198° dec. (from $CH_3NO_2$).

This compound inhibited the growth of *Pasteurella multocida* at concentrations of less than 0.01 mcg./ml., against *Streptococcus agalactiae* at concentrations of 1 mcg./ml. against *Salmonella gallinarum, Salmonella typhimurium, Bacillus subtilis* and *Escherichia coli* at concentrations of 10 mcg./ml., and against *Staphylococcus aureus, Pseudomonas aeruginosa* and *Proteus mirabilis* at concentrations of 100 mcg./ml.

Under the conditions of the in vivo experiments, the compounds failed to protect mice against *Salmonella choleraesuis* but did protect 40% of the mice against *Escherichia coli*.

EXAMPLE 25

α-(6,7-dichloro-3-methyl-1,4-dioxidoquinoxalin-2-yl)-N-methylnitrone

Following the procedure described in Example 1, 2-formyl - 6,7 - dichloro-3-methylquinoxaline 1,4-dioxide (2.73 g., 0.01 mole) and N-methylhydroxylamine hydrochloride (0.84 g., 0.01 mole) gave a yellow solid, (0.42 g., 14%), M.P. 174–175° dec. (from $CH_3NO_2$).

This compound had an in vitro minimum inhibitory activity of 10 mcg./ml. against *Salmonella gallinarum* and *Pasteurella multocida*. It was effective against *Salmonella typhimurium, Staphylococcus aureus, Streptococcus agalactiae, Proteus mirbailis, Esiripelothrix insidiosa, Bacillus subtilis, Escherichia coli, Aspergillus fumigatus* and *Candida albicans* at concentrations of 100 mcg./ml. It had moderate to good activity against infections in mice of *Salmonella choleraesuis* and *Escherichia coli* under the conditions of the experiment described below.

EXAMPLE 26

α-(3-methyl-6,7-methylenedioxy-1,4-dioxidoquinoxalin-2-yl)-N-methylnitrone

Following the procedure described in Example 1,2-formyl-3-methyl-6,7-methylenedioxyquinoxaline 1,4-dioxide (2.48 g., 0.01 mole) and N-methylhydroxylamine hydrochloride (0.84 g., 0.01 mole) gave a bright yellow solid (0.61 g., 22%), M.P. 207° dec. (from $CH_3NO_2$).

EXAMPLE 27

α-(3-methyl-6,7-dimethoxy-1,4-dioxidoquinoxalin-2-yl)-N-methylnitrone

Following the procedure described in Example 1, 2-formyl - 3 - methyl-6,7-dimethoxyquinoxaline 1,4-dioxide (2.64 g., 0.01 mole) and N-methylhydroxylamine hydrochloride gave the compound of this example.

EXAMPLE 28

2-formyl-3,6 (or 3,7)-dimethylquinoxaline 1,4-dioxide 2,3,6-trimethylquinoxaline 1,4-dioxide (25.73 g., 0.126 mole) was dissolved in ethylacetate (250 ml.), selenium dioxide (15.00 g., 0.135 mole) added, and the mixture refluxed and stirred for 1.5–4 hrs. The ethyl acetate was removed in vacuo and the residue triturated with anhydrous ether yielded the crude product (16.60 g., 60%). Recrystallization from a mixture of ethylacetate and methylenechloride gave orange crystals, M.P. 163–166°. See: U.S. Pat. 3,344,022 (Sept. 26, 1967), J. D. Johnston (Chas. Pfizer & Co., Inc.).

EXAMPLE 29

2-formyl-6 (or 7)-methoxy-3-methylquinoxaline 1,4-dioxide

Following the procedure described above, reaction of 2,3-dimethyl-6-methoxyquinoxaline 1,4-dioxide (27.75 g., 0.126 mole) and selenium dioxide (15.00 g., 0.135 mole) gave an orange solid (15.05 g., 51%). Recrystallization from ethyl acetate gave orange crystals, M.P. 184–186° dec.

In like manner other 2-formyl-3-methyl-6 (or 7-substituted quinoxaline 1,4-dioxides and 2-formyl-3-methyl-6,7-substituted quinoxaline 1,4-dioxides which are required intermediates in the above reactions were prepared from the appropriate 2,3-dimethylquinoxaline 1,4-dioxides.

The in vivo activity of the compounds of this invention as prepared in the above examples was determined with mice infected with a lethal dose of *Salmonella choleraesuis* according to the following procedure.

Test mice weighing 19–21 grams were used in the test. Each group of five mice was assigned to each test drug which was placed in the feed at a 0.025% level by weight. Each group of mice was allowed free access to its assigned feed containing the test drug. The mice were infected by injecting intraperitoneally with 0.2 ml. of a 1:100,000 dilution of a 5 hour brain heart infusion broth culture of *Salmonella choleraesuis* variety Kunzendorf (ATCC #12011). Mortality records were maintained for six days post-infection with each group of mice receiving its respective test drug throughout this period. At the completion of the test the percent survival was calculated for each test drug in the feed. Non-medicated, infected mice had 90–100% mortality in the tests.

The feed, apart from the test drug, had an analysis of 24% minimum of crude protein, 4% minimum of crude fat, and 4.5% maximum crude fiber. The feed contained: animal liver meal, fish meal, dried whey, corn and wheat flakes, ground yellow corn, ground oat groats, dehulled soybean meal, wheat germ meal, wheat middlings, cane molasses, dehydrated alfalfa meal, soybean oil, brewers dried yeast, vitamin A palmitate, irradiated dried yeast (source of vitamin $D_2$), riboflavin, niacin, calcium pantothenate, choline chloride, D-activated animal sterol, a-tocopherol, thiamine hydrochloride, menadione sodium bisulfite (source of vitamin K activity), dicalcium phosphate, salt and traces of: manganous oxide, copper sulfate, iron carbonate, potassium iodate, cobalt sulfate and zinc oxide. The results of this test are indicated in the specific examples.

The in vivo activity of the compounds of the present invention was also determined in mice having a lethal *Escherichia coli* infection in accordance with the following procedure.

Test mice weighing 19–21 grams were used in the test. Each group of five mice was assigned to each test drug. The mice were infected by injecting intraperitoneally with 0.3 ml. of a 1:100 dilution of a four-hour brain heart infusion broth culture of *Escherichia coli* (serotype 141: K87-NM). Immediately following inoculation with the bacteria each test drug was administered to its appropriate group of mice by a subcutaneous dose calculated at a 25 mg./kg. dose. Mortality records were maintained for three days post-infection. The infected non-medicated controls had mortalities of 90–100% in the test. At the completion of the test, the percent survival was calculated for each test drug. The results of this test are shown in the specific examples.

What is claimed is:
1. A 1,4-dioxidoquinoxalinyl nitrone having the following formula:

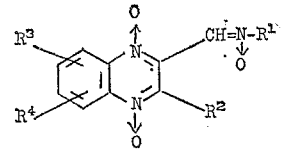

in which $R^1$ is an alkyl radical of 1 to 10 carbon atoms of straight, branched chain or cyclic configuration which may be substituted with hydroxy, dihydroxy, lower alkoxy, acetoxy, chloro or fluoro groups, or $R^1$ may be a phenyl radical or a phenyl radical substituted with a lower alkyl group of 1 to 4 carbon atoms or a chloro; $R^2$ is hydrogen, lower alkyl of 1 to 4 carbon atoms; and $R^3$ and $R^4$ are chosen from the group consisting of hydrogen, alkoxy or alkyl of 1 to 4 carbon atoms, chloro, trifluoromethyl or nitro groups.

2. α - (3-methyl-1,4-dioxidoquinoxalin-2-yl)-N-methylnitrone.

3. α-[6 (or 7)-nitro-3-methyl-1,4-dioxidoquinoxalin-2-yl]-N-methylnitrone.

4. α-[6 (or 7)-chloro-3-methyl-1,4-dioxidoquinoxalin-2-yl]-N-methylnitrone.

References Cited
UNITED STATES PATENTS 3,371,090   2/1968   Johnston et al. _____ 260—250 R NICHOLAS S. RIZZO, Primary Examiner U.S. Cl. X.R.

424—250